UNITED STATES PATENT OFFICE.

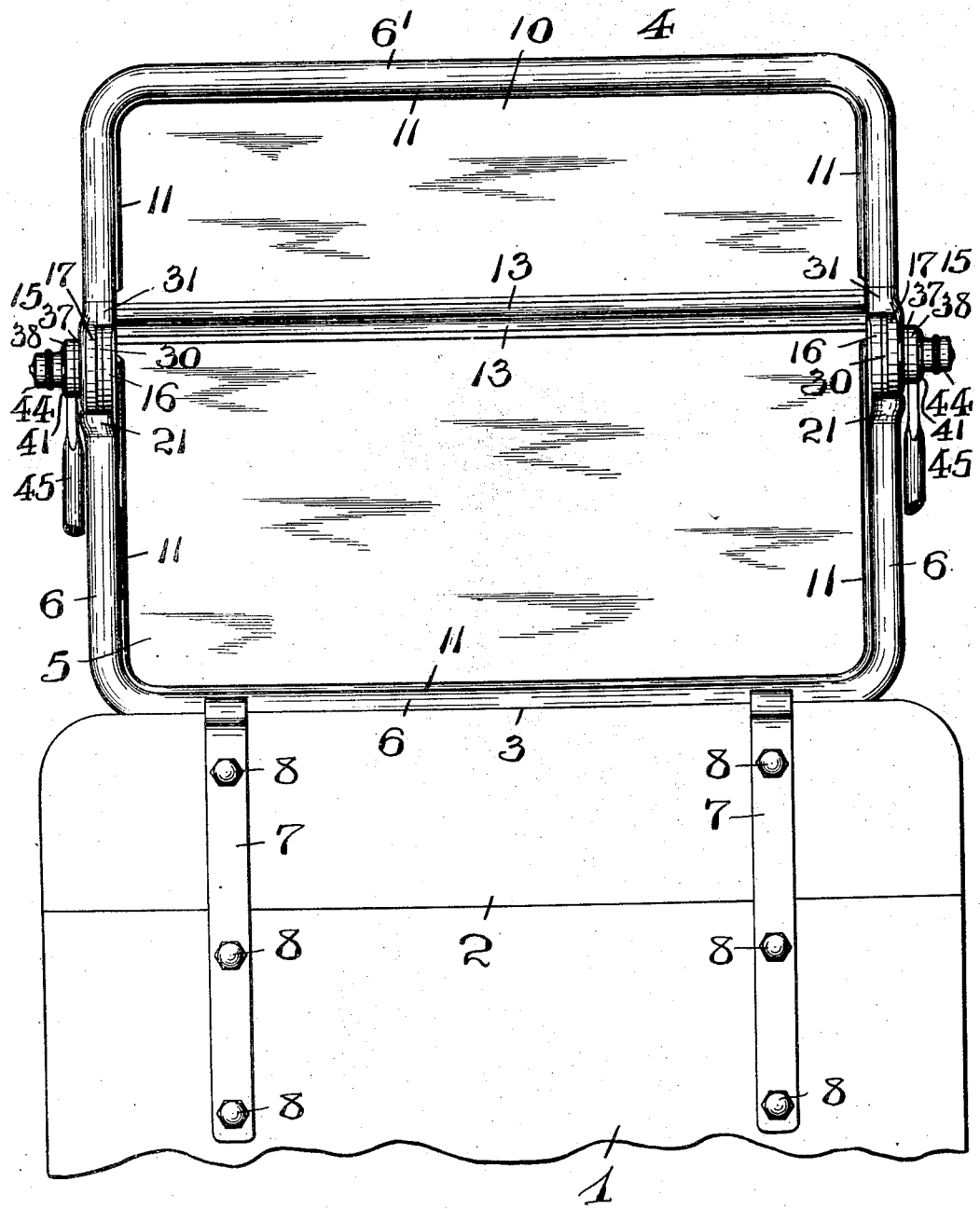

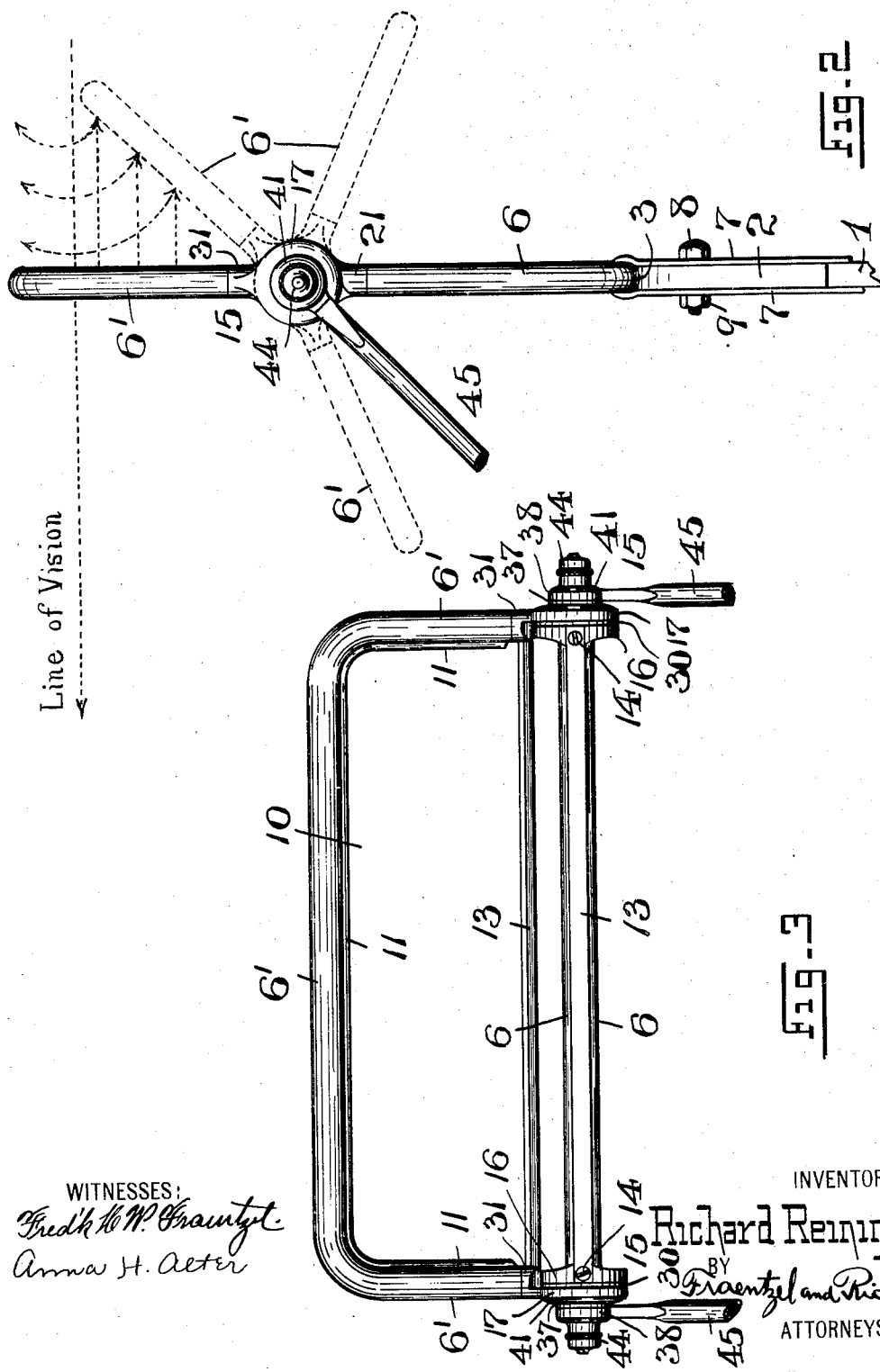

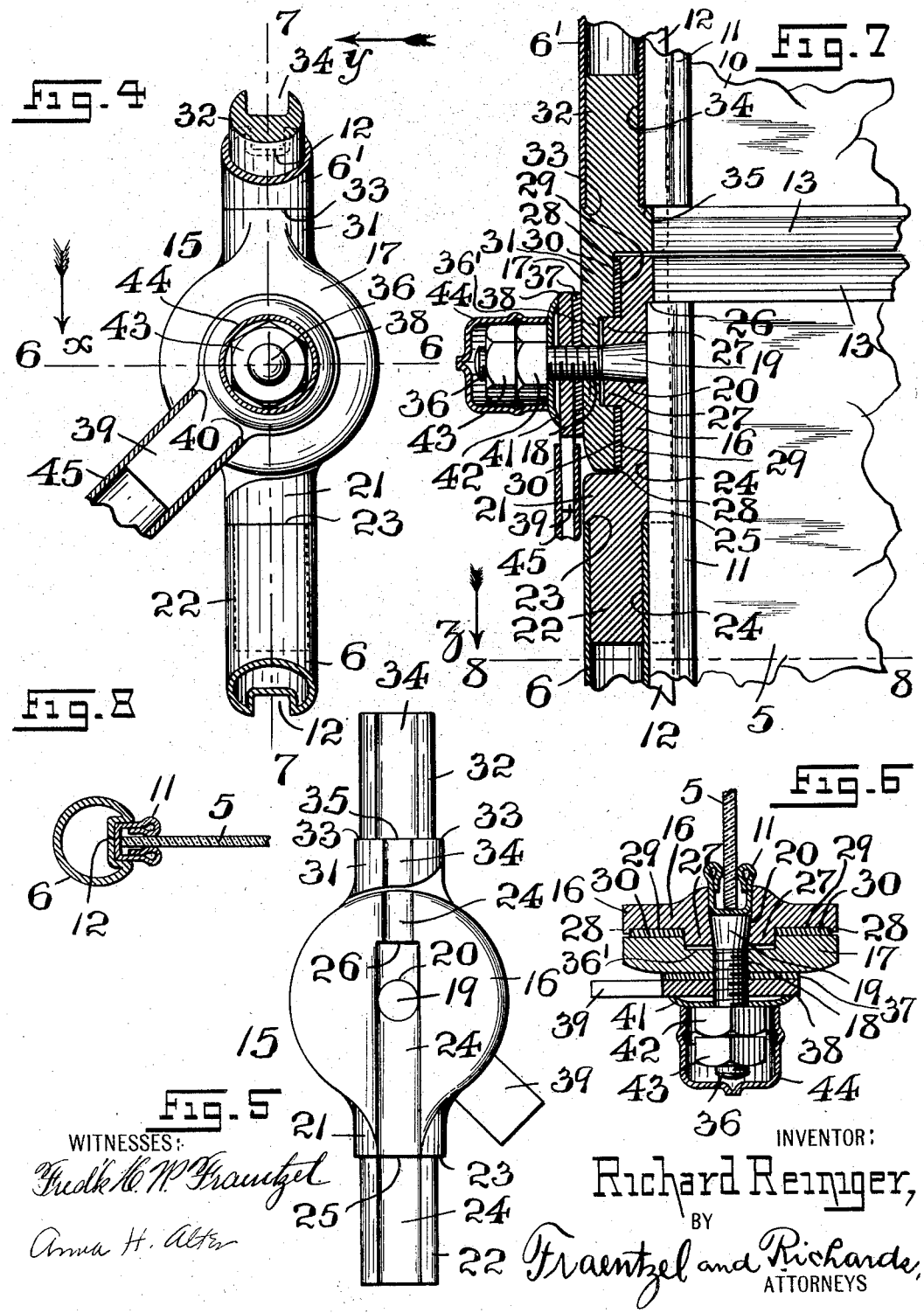

RICHARD REININGER, OF NEWARK, NEW JERSEY, ASSIGNOR TO NEWARK RIVET WORKS, A CORPORATION OF NEW JERSEY.

WIND-GUARD OR STORM-SHIELD.

1,115,571.  Specification of Letters Patent.  Patented Nov. 3, 1914.

Application filed July 14, 1909. Serial No. 507,461.

*To all whom it may concern:*

Be it known that I, RICHARD REININGER, a citizen of the United States, residing at Newark, in the county of Essex and State of New Jersey, have invented certain new and useful Improvements in Wind-Guards or Storm-Shields; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in wind-guards or storm-shields for vehicles; and, the present invention relates, more particularly, to improvements in that class of wind-guards or shields which are used upon the front of an automobile or similar vehicle.

My present invention has for its principal object to provide a wind-guard or storm-shield of the general character hereinafter more fully set forth, and which comprises in its structure a pair of transparent sections or members, usually of glass, and their corresponding frames, which are pivotally connected with each other by means of suitably constructed hinges, whereby the upper transparent section or member can be moved and is automatically held by frictional engagement of the hinge-members in its vertical position, or at any other angle with relation to the normal and fixed vertical position of the other transparent section or member, either in front of or back of the dash-board of the vehicle, or other fixture to which said lower transparent section or member has been affixed.

This invention, therefore, has for its principal object to provide a novel and simply constructed wind-guard or storm-front which is especially adapted for use with automobiles, comprising two transparent sections or members, said sections or members being connected by friction-hinges so as to enable the movable upper section or member to be easily and quickly manipulated by one hand, either by a push or pull as may be necessary, so that the said section or member can be moved without the necessity of the driver of the vehicle having his attention withdrawn from the steering-wheel and other controlling mechanism of the vehicle.

Another object of this invention is to provide a wind-guard or storm-shield for automobiles, comprising two transparent sections or members, the upper one of which can be brought into any angular relation with relation to the vertical position of the lower transparent section or member, while in the forms of wind-guards or shields for automobiles as now ordinarily constructed, the positions in which the upper shield-section or member can be secured are very limited, being limited usually to but two positions only.

Other objects of this invention not at this time more particularly enumerated will be clearly understood from the following detailed description of the same.

With the various objects of my present invention in view, the said invention consists, primarily, in the novel wind-guard or storm-shield of the general character hereinafter set forth; and, the invention consists, furthermore, in the novel arrangements and combinations of devices and parts, as well as in the details of the construction of the same, all of which will be more fully described in the following specification and then finally embodied in the clauses of the claim which are appended to and which form an essential part of this specification.

The invention is clearly illustrated in the accompanying drawings, in which:—

Figure 1 is a front view of a wind-guard or storm-shield made according to and embodying the principles of the present invention, said view showing in connection therewith a portion of the dash-board of an automobile and a clamping or fastening means for affixing the wind-guard or shield upon the upper marginal edge of the said dash-board. Fig. 2 is an end elevation of the various parts represented in said Fig. 1, said view showing in connection therewith in dotted outline, various of the adjusted positions of the upper movable guard or shield-section or member; and Fig. 3 is a top edge view of the various parts represented in said Fig. 2, and showing the upper movable shield or guard-section or member moved into one of the angular planes indicated by the lower dotted position of the said upper section upon the right hand side of said Fig. 2. Fig. 4 is a front face view of one of the hinged connections, for movably connecting the upper shield-section or member with the lower shield-section or member, said view showing in connection therewith portions of the two frame-members of the upper and lower shield or guard-section; Fig. 5 is a rear view of the same; and Fig. 6 is a horizontal section taken on line 6—6 in said Fig. 4, looking in the direction of the arrow $x$. Fig. 7 is a vertical section, taken on line 7—7 in said Fig. 4, looking in the direction of the arrow $y$, and showing in connection with the parts of the hinge, portions of the framework and glasses of the upper and lower transparent shield-sections or members; and Fig. 8 is a cross section taken on line 8—8 in said Fig. 7, looking in the direction of the arrow $z$.

Similar characters of references are employed in all of the above described views to indicate corresponding parts.

Referring now to the said figures of the drawings, the reference-character 1 indicates a portion of any usual dash-board of an automobile, upon the upper marginal edge-portion of which is arranged another member or section, as 2, the upper marginal edge-portion 3 of which is usually made concave, as indicated in Fig. 2 of the drawings.

The reference-character 4 indicates a complete wind-guard or storm-shield which embodies the principles of my present invention, and the same comprises a lower transparent section or member 5, the surrounding frame-work 6 of which is placed in the concave or grooved part 3 of the said section, or member 2 and is secured thereto by means of suitably formed clamps, as 7, secured in place upon the parts 1 and 2 by means of bolts 8 and nuts 9, substantially as shown in the several figures of the drawings.

The reference-character 10 indicates an upper movable transparent section or member and $6^1$ is the surrounding frame-work of the same. The said sections or members 5 and 10 are usually plates of glass, and are surrounded by the usual frame-like elements 11 which are inserted and secured in any suitable manner in the usual depressed or recessed portions 12 of the main frame-work 6 and $6^1$, substantially in the manner illustrated in Figs. 1, 3, 7 and 8 of the drawings. The said sections or members 5 and 10 are each surrounded on three edges only by the frame-like elements 11, while the fourth marginal edge-portion of each section or member 5 and 10 is bounded by means of a metal binding-strip 13, secured in place, usually by means of the screws 14, shown in Fig. 3 of the drawings.

The two members or sections 5 and 10 of the wind-guard or storm-shield are pivotally connected substantially in the manner illustrated in Figs. 1, 2 and 3 of the drawings, by means of a pair of friction-hinges 15. The general construction of this form of hinge, which enables the operator to easily and quickly adjust the upper section or member 10 in any one of its angular positions with relation to the vertical position of the lower section or member 5, is shown more particularly in Figs. 4, 5, 6 and 7 of the drawings. Referring now to said last-mentioned figures, the reference-characters 16 and 17 indicate a pair of disk-shaped hinge-members, the member 16 being formed with a suitably formed hole or perforation, as 18, in which is arranged and permanently secured the end-portion of a pivot or pin 19. The other hinge-member 17 is made with a hole or perforation 20 into and through which the said pivot or pin 19 extends, so that the said hinge-member 17 is movably disposed upon said pivot or pin. As shown, the hinge-member 16 is formed with an off-set or projection, as 21, from which extends a short shank 22 which provides with the said off-set or projection 21, an annular shoulder 23. As will be seen, more particularly from an inspection of said Fig. 5, the said hinge-member 16, as well as the off-set or projection 21 and the shank 22 are provided with a continuous channel or groove 24. This channel or groove is of different widths and depths, so as to provide two off-sets 25 and 26, substantially as shown and for the purposes to be presently more fully described. From an inspection of Figs. 6 and 7 of the drawings, it will be seen, that the said hinge-member 16 is made with a centrally raised part 27 and with a marginal projection 28, all arranged to provide an annular recess 29 in which I have placed a friction device 30, usually a packing ring or washer made of leather, or other suitable flexible material. As shown this packing ring or washer is of slightly greater thickness than the depth of the annular recess which is formed by the said centrally raised part 27 and the marginal projection 28, so that the one face of said ring or washer will extend above the plane of said projection 28, substantially as shown.

The other hinge-member 17 is also made with an offset or projection, as 31, from which extends a short shank 32 which provides with said off-set or projection 31, an annular shoulder 33. The said offset or projection 31 and the shank 32 are provided with a continuous channel or groove 34, said channel or groove being of different widths and depths, so as to provide an off-set 35, substantially as shown and for the purposes to be presently more fully described. The said disk-shaped hinge-member 17 is formed with a central depression or recess, as $36^1$, into which the centrally raised part 27 of the disk-shaped hinge-member 16 projects, when the said member 17 is placed upon the screw-threaded shank 36 of the previously mentioned pivot or pin 19, as shown in said Figs. 6 and 7, with the said friction-washer 13 or disk 30 having its flat faces in frictional holding engagement with the flat surface-portions of the two hinge-members 16 and 17. Suitably disposed upon the screw-threaded portion of the pivot or pin 19 which extends beyond the outer face of the said hinge-member 17 is a packing-disk or friction-ring 37 which is made of leather, or other suitable material, and placed upon said pin or pivot 19 and against said friction-ring 37 is a perforated disk-like member or element 38 which is formed with a flat shank or extension, as 39, and has a pair of off-sets 40. In addition to said member or element 38, there are arranged upon the screw-threaded shank of the pin 19, a dished washer 41, made from a suitable spring-metal, and a pair of nuts 42 and 43, the latter a lock-nut, for retaining the hinge-members in their pivotally connected relations, as will be clearly understood. To provide a suitable and ornamental finish, a sheet-metal cap or thimble 44 is slipped over the said nuts 42 and 43, and is held in place by frictional contact with the said nuts.

Having in the above manner constructed and assembled the various devices and parts so as to provide the friction hinges 15, the shank 22 of a hinge is inserted in the open end of the tubular frame-work 6, the free end-portion of the frame-work being fitted directly against the shoulder 23 and the off-set 25. The upper end-portion of the frame-like element 11 which is connected with the section or member 5, extends in an upward direction from the recessed portion of the frame-work into the channel or groove 24 until the end of the element 11 abuts against the offset 26, and the end-portion of the laterally extending binding-strip 13 of said section or member 5 being fitted in that portion of said channel or groove 24 located above the offset 26, substantially as illustrated in Fig. 7 of the drawings. In a like manner, the shank 32 of the hinge is inserted in the open end of the tubular frame-work 6¹, the free end-portion of the frame-work being fitted directly against the shoulder 33, and the lower end-portion of the frame-like element 11 which is connected with the upper section or member 10 abutting directly against the offset 35, while the free end of the laterally extending binding-strip 13 of said section or member 10 is fitted in that portion of the groove or channel 34 directly beneath said off-set 35, all of which will be clearly understood from an inspection of said Fig. 7 of the drawings.

The construction of the two hinge-members 16 and 17 and the respective off-sets or projections 21 and 31 is such, that the upper movable section or member 10 has a limited rotary movement, as will be clearly understood from an inspection of the several figures of the drawings. As shown in Figs. 1, 2, 3 and 7 of the drawings, the upper and flattened end-portion of a tubular rod 45 may be arranged upon each flat shank or extension 39 of each member or element 38, the lower end-portion of each rod or brace 45 being suitably secured to any part of the frame-work of the vehicle, in the usual and well-known manner.

From the foregoing description of my present invention it will be clearly seen that I have provided a simply constructed and easily operated wind-guard or storm-shield for automobiles and the like, the said guard or shield comprising a lower fixed transparent element and an upper movable transparent element which can be easily and quickly moved by the operator, by means of one hand, into any desired angular position with relation to the fixed position of the lower member or element, so as to enable the upper member to be placed at a suitable angle, either in the front or the back of the dash-board of the vehicle, without obstructing the line of vision of the person seated in the vehicle, and at the same time acting as a shield or conveyer for conducting the dust and wind directly over the head of the person within the vehicle, as clearly indicated by the arrows shown in said Fig. 2 of the drawings.

I am aware that some changes may be made in the general arrangements and combinations of the various devices and parts, without departing from the scope of my present invention as set forth in the foregoing specification, and as defined in the clauses of the claim which are appended to the said specification. Hence, I do not limit my invention to the exact arrangements and combinations of the devices and parts as described in the said specification, nor do I confine myself to the exact details of the construction of the said parts, as illustrated in the accompanying drawings.

I claim:—

1. A friction hinge for a wind-guard or storm-shield for vehicles consisting of a pair of disk-shaped hinge-members, an extension extending from each hinge-member, and a shank connected with each extension, said shanks, extensions, and one of said disk-shaped hinge-members being provided with continuous groove-like portions into which parts of the frame-work of the shield-members are adapted to be fitted, a screw-threaded pivot-pin extending from the hinge-member which is provided with the groove-like portion and said pin being arranged in a perforation with which the other hinge-member is provided, a friction-washer between said hinge-members, a second friction washer upon said pivot-pin, a disk-shaped plate upon said pin provided with means for the attachment of a brace thereto, a spring-washer upon said pivot-pin, and nuts screwed upon the screw-threaded portion of said pivot-pin for securing said parts in their assembled and pivotal relations.

2. A friction hinge for a wind-guard or storm-shield for vehicles consisting of a pair of disk-shaped hinge-members, an extension extending from each hinge-member, and a shank connected with each extension, said shanks, extensions, and one of said disk-shaped hinge-members being provided with continuous groove-like portions into which parts of the frame-work of the shield-members are adapted to be fitted, a screw-threaded pivot-pin extending from the hinge-member which is provided with the groove-like portion and said pin being arranged in a perforation with which the other hinge-member is provided, a friction-washer between said hinge-members, a second friction-washer upon said pivot-pin, a disk-shaped plate upon said pin provided with means for the attachment of a brace thereto, a spring-washer upon said pivot-pin, nuts screwed upon the screw-threaded portion of said pivot-pin for securing said parts in their assembled and pivotal relations, and means connected with said hinge-like members for limiting the movement of said upper shield-member.

3. A friction hinge for a wind-guard or storm-shield for vehicles consisting of a pair of disk-shaped hinge-members, an extension extending from each hinge-member, and a shank connected with each extension, said shanks, extensions, and one of said disk-shaped hinge-members being provided with continuous groove-like portions into which parts of the frame-work of the shield-members are adapted to be fitted, a screw-threaded pivot-pin extending from the hinge-member which is provided with the groove-like portion and said pin being arranged in a perforation with which the other hinge-member is provided, a friction-washer between said hinge-members, a second friction washer upon said pivot-pin, a disk-shaped plate upon said pin provided with means for the attachment of a brace thereto, a spring-washer upon said pivot-pin, and nuts screwed upon the screw-threaded portion of said pivot-pin for securing said parts in their assembled and pivotal relations, and a friction-thimble arranged over said nuts.

4. A friction hinge for a wind-guard or storm-shield for vehicles consisting of a pair of disk-shaped hinge-members, an extension extending from each hinge-member, and a shank connected with each extension, said shanks, extensions, and one of said disk-shaped hinge-members being provided with continuous groove-like portions into which parts of the frame-work of the shield-members are adapted to be fitted, a screw-threaded pivot-pin extending from the hinge-member which is provided with the groove-like portion and said pin being arranged in a perforation with which the other hinge-member is provided, a centrally disposed raised part and a marginal projection upon the inner face of said first-mentioned hinge-member, said second-mentioned hinge-member being provided with a centrally disposed depression into which said raised part projects, a friction-washer arranged between said raised part and said marginal projection of the first-mentioned hinge-member and in frictional engagement with the inner face of said second-mentioned hinge-member, a second friction-washer upon said pivot-pin, a disk-shaped plate upon said pin provided with means for the attachment of brace thereto, and a spring-washer upon said pivot-pin for securing said parts in their assembled and pivotal relations.

In testimony, that I claim the invention set forth above I have hereunto set my hand this twelfth day of July, 1909.

RICHARD REININGER.

Witnesses:
 FRED'K H. W. FRAENTZEL,
 FREDK. C. FRAENTZEL.